(12) United States Patent
Koyama et al.

(10) Patent No.: US 8,091,872 B2
(45) Date of Patent: Jan. 10, 2012

(54) FLUID-FILLED TYPE VIBRATION DAMPING DEVICE

(75) Inventors: Hironori Koyama, Kasugai (JP); Atsushi Muramatsu, Komaki (JP); Akio Saiki, Komaki (JP); Takayoshi Yasuda, Iwakura (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 791 days.

(21) Appl. No.: 12/104,184

(22) Filed: Apr. 16, 2008

(65) Prior Publication Data
US 2008/0296818 A1 Dec. 4, 2008

(30) Foreign Application Priority Data
May 31, 2007 (JP) ................................. 2007-144302

(51) Int. Cl.
*F16F 5/00* (2006.01)
(52) U.S. Cl. .......... 267/140.14; 267/140.11; 267/140.13
(58) Field of Classification Search ............. 267/140.14, 267/140.11, 140.13
See application file for complete search history.

(56) References Cited

U.S. PATENT DOCUMENTS

| | | | | |
|---|---|---|---|---|
| 4,836,515 A | * | 6/1989 | Franz et al. ..................... | 267/219 |
| 4,872,652 A | * | 10/1989 | Rohner et al. ............ | 267/140.14 |
| 5,398,917 A | * | 3/1995 | Carlson et al. ............ | 267/140.14 |
| 6,176,477 B1 | * | 1/2001 | Takeo et al. ............... | 267/140.11 |
| 6,276,673 B1 | * | 8/2001 | Hibi et al. ................. | 267/140.14 |
| 6,445,149 B1 | | 9/2002 | Muramatsu et al. | |
| 6,631,895 B2 | | 10/2003 | Nemoto | |
| 6,921,067 B2 | * | 7/2005 | Gries et al. ............... | 267/140.14 |
| 7,021,611 B2 | | 4/2006 | Nemoto | |
| 7,242,567 B2 | | 7/2007 | Nemoto | |
| 7,338,036 B2 | * | 3/2008 | Freudenberg et al. ... | 267/140.15 |
| 2003/0034598 A1 | * | 2/2003 | Miyoshi et al. .......... | 267/140.14 |

(Continued)

FOREIGN PATENT DOCUMENTS

JP 59-151637 8/1984

(Continued)

OTHER PUBLICATIONS

Notification of Reason for Refusal issued Apr. 26, 2011 in Japanese Patent Application No. 2007-144302 (with extract English translation).

*Primary Examiner* — Robert Siconolfi
*Assistant Examiner* — James Hsiao
(74) *Attorney, Agent, or Firm* — Oblon, Spivak, McClelland, Maier & Neustadt, L.L.P.

(57) ABSTRACT

A fluid filled type vibration damping device includes a first mounting member, a second mounting member, a main rubber elastic body, a flexible film, a partition member, a valve, a coil, a control-signals-generating circuit and a power amplifier circuit. The valve enables to switch the second orifice passage between an open state and a closed state. The second orifice passage communicates the pressure-receiving chamber and the equilibrium chamber with each other. The switch of the valve is performed by an electromagnetic force occurring by an electrical connection of the coil. Furthermore the control-signals-generating circuit is formed and disposed separately from the coil. The control-signals-generating circuit produces state switching control signals of the valve. Moreover the power amplifier circuit which supplies an electric-current to the coil by amplifying the state switching control signals, constitutes an actuator unit attached integrally to the coil, and is disposed separately from the control-signals-generating circuit.

4 Claims, 4 Drawing Sheets

U.S. PATENT DOCUMENTS

2005/0218570 A1 * 10/2005 Ueki .................. 267/140.11
2006/0186308 A1    8/2006 Ishiguro et al.

FOREIGN PATENT DOCUMENTS

| | | |
|---|---|---|
| JP | 5-231468 | 9/1993 |
| JP | 6-188121 | 7/1994 |
| JP | 9-195736 | 7/1997 |
| JP | 9-280304 | 10/1997 |
| JP | 2000-173821 | 6/2000 |
| JP | 2002-139095 | 5/2002 |
| JP | 2004-36754 | 2/2004 |
| JP | 2005-93628 | 4/2005 |
| JP | 3780778 | 3/2006 |
| JP | 2006-194271 | 7/2006 |

* cited by examiner

FLUID-FILLED TYPE VIBRATION DAMPING DEVICE

INCORPORATION BY REFERENCE

This invention is based on Japanese Patent Application No. 2007-144,302, filed on May 31, 2007, the entire contents of which are incorporated herein by reference.

BACKGROUND OF THE INVENTION

1. Field of the Invention

The present invention relates to a fluid filled type vibration damping device supporting a power unit to a vehicle body within vibration damping.

2. Description of the Related Art

One of such known fluid filled type vibration damping devices is shown in JP-A-59-151637. The fluid filled type vibration damping device shown in JP-A-59-151637 elastically connects a first mounting member and a second mounting member by a main rubber elastic body, and makes to partition a fluid chamber, which is formed with the main rubber elastic body and the flexible film, into a pressure-receiving chamber on the side of the main rubber elastic body and an equilibrium chamber on the side of the flexible film by a partition member.

Furthermore the fluid filled type vibration damping device shown in JP-A-59-151637 provides a first orifice passage having been tuned to a low-frequency band correspond to shake vibration and a second orifice passage having been tuned to a high-frequency band correspond to idling vibration as orifice passages communicating the pressure-receiving chamber and the equilibrium chamber with each other, and switches these first and second orifice passages by moving the valve by the electromagnetic force occurring by the electrical connection of the coil.

In this way, by controlling the electrical connection of the coil based on the driving state, the vibration damping effect to shake vibration making a problem during driving and the vibration damping effect to idling vibration making a problem at the stop can be produced effectively.

In these fluid filled type vibration damping devices, not described in JP-A-59-151637, the device includes a microcomputer, which produce the control signals based on the driving state, and a power amplifier circuit, which amplify this control signals and connect to the coil electrically, to control the electrical connection of the coil.

Moreover, conventionally a microcomputer and a power amplifier circuit were both mounted on the same circuit board and constituted control unit. Furthermore, this control unit was disposed separately from the main body of the fluid filled type vibration damping device and output of the control unit was supply to the coil by the electric power line.

SUMMARY OF THE INVENTION

By the way, the size of the fluid filled type vibration damping device itself are different for example according to vehicle types. Therefore, the amount of electric-current supply to the coil for moving each valve are different. That is, with the specification of the valve and the specification of the coil are different according to each vehicle types, the power amplifier circuit must be constituted of the elements and others according to the specification of the valve and/or the specification of the coil. Therefore, the valve and the coil, and the power amplifier circuit have a relation one to one substantially. Therefore, the main body of the fluid filled type vibration damping device, which includes the coil, and the control units, which includes integrally the microcomputer and the power amplifier circuit, must be designed according to each vehicle types.

Furthermore, according to same vehicle types, the design specification of the main body of the fluid filled type vibration damping device are also changed as needed. For example, when the amount of electric-current supply to the coil for moving the valve is made to increase in accordance with changing the structure of the valve, with changing the valve structure, the elements which constitute the power amplifier circuit are changed according to circumstances. That is, when the structure of the valve and others are changed, the specification of the power amplifier circuit is needed to change, and the reverse is similar too according to circumstances. Therefore, on the case of changing the structure of the valve and others, the control unit itself which include the microcomputer and the power amplifier circuit integrally were needed to change.

Furthermore, because the main body of the fluid filled type vibration damping device and the control unit have a relation one to one, these two parts must be performed part management as one pair. On the contrary, it can be thought that the control unit is attached to the main body of the fluid filled type vibration damping device integrally. However, in that case, the information signals about driving state must be communicated from for example, the engine controller which grasp the driving state to the microcomputer attached to the main body of the fluid filled type vibration damping device integrally.

These information signals are small voltage signals and are easily affected by noise. Therefore, there might arise a fear that the noise is picked up on the information signals of the driving state, obtained from the engine controller, and the valve can not be driven appropriately. Accordingly, it is expected that the control unit is disposed near the engine controller or is disposed in the place that is difficult to affect by noise as far as the engine controller. That is, the control unit and the main body of the fluid filled type vibration damping device must comes to be separate members.

It is therefore one object of this invention to provide a fluid filled type vibration damping device, which is able to contrive to make component part commonization even if the specification of the valve and so on are different, and is able to do good part management.

The present invention provides a fluid filled type vibration damping device comprising:
a first mounting member attached one of a power unit and a body of a vehicle;
a second mounting member attached the other of the power unit and the body of the vehicle;
a main rubber elastic body elastically connecting the first mounting member and the second mounting member;
a flexible film mounted the second mounting member and forming a fluid chamber between the flexible film and the main rubber elastic body, having a non-compressible fluid sealed therein;
a partition member mounted to the second mounting member, the partition member for dividing the fluid chamber into a pressure receiving chamber, a part of whose wall the main rubber elastic body makes, and an equilibrium chamber, a part of whose wall the flexible film makes, the partition member for forming a first orifice passage communicating the pressure receiving chamber and the equilibrium chamber with each other and being tuned to a low-frequency band, which corresponds to shake vibration that the power unit produces, and the partition member for forming a second orifice passage being tuned to a high-frequency band, which corresponds to idling vibration;

a valve supported by the partition member allowing to move relatively, enabling to switch the second orifice passage between an open state and a closed state in accordance with respectively a state that the vehicle generate the shake vibration and a state that the vehicle generate the idling vibration;

a coil attached the second mounting member or the partition member, moving the valve by an electromagnetic force, which occurs by an electrical connection;

a control-signals-generating circuit formed and disposed separately from the second mounting member, the partition member and the coil, the control-signals-generating circuit for generating a state switching control signals of the valve based on a vehicle state signals, which are signals for discriminating the state that the vehicle generates the shake vibration and the state that the vehicle generates the idling vibration; and a power amplifier circuit constituted an actuator unit attached integrally to the second mounting member, the partition member or the coil, the power amplifier circuit being disposed separately from the control-signals-generating circuit, and the power amplifier circuit for supplying the electric-current to the coil by amplifying the state switching control signals.

That is, according to the fluid filled type vibration damping device of the present invention, at the vehicle is in the driving state, if the main vehicle vibration is shake vibration, the valve make the second orifice passage a closed state. Accordingly, by that the non-compressible fluid flow in the first orifice passage communicating the pressure-receiving chamber and the equilibrium chamber with each other, the shake vibration is able to be inhibited appropriately. On the other hand, at the vehicle is in the idling state, if the main vehicle vibration is idling vibration, the valve make the second orifice passage an open state. Furthermore, the frequency band of the idling vibration is higher than that of the shake vibration. Therefore, by that the non-compressible fluid flow in the second orifice passage communicating the pressure-receiving chamber and the equilibrium chamber with each other, the idling vibration is able to be inhibited appropriately.

Hereinafter, the first mounting member, the second mounting member, the main rubber elastic body, the flexible film, the partition member, the valve and the coil, constitute the fluid filled type vibration damping device of the present invention, are called the main body of the fluid filled type vibration damping device.

Furthermore, the control-signals-generating circuit include an operation processing circuit, for example a microcomputer and so on. This control-signals-generating circuit comprise of for example ROM memorizing operation programs and others, RAM memorizing input information and others temporarily, CPU doing operation process which carry out operation programs according to the input information, and so on. Furthermore, the state switching control signals generated by the control-signals-generating circuit are the signals which maximum voltage is 5V or 3.3V and so on. Additionally, the power amplifier circuit amplifies to the electric-current as large as it can move the valve by the state switching control signals, which maximum voltage is 5V or 3.3V and so on, are supplied to the coil. That is, the electric-current, which flow in the wiring connecting the power amplifier circuit with the coil, comes to be larger than the electric-current which flow in the wiring connecting the control-signals-generating circuit with the power amplifier circuit.

This power amplifier circuit can be applied to the circuit constitute a switching element, for example field effect transistor (FET) and so on.

Furthermore, according to the fluid filled type vibration damping device of the present invention, the control-signals-generating circuit is formed and disposed separately from the power amplifier circuit. That is, as compared with that the conventional devices were composed of the control unit, which include the control-signals-generating circuit (microcomputer) and the power amplifier circuit integrally, in the present invention the both circuits are formed separately.

As above-mentioned, "the valve and the coil" and "the power amplifier circuit" have a relation one to one, in other words the relation that whenever the specification of the valve and the coil are changed, the specification of the power amplifier circuit must be also changed. That is, in the fluid filled type vibration damping device mounted on the different vehicle types, the main body of the fluid filled type vibration damping device which include the valve and the coil, and the power amplifier circuit both need each design conformed respectively. And, also in the specification changed fluid filled type vibration damping device mounted on the same vehicle types, the main body of the fluid filled type vibration damping device which include the valve and the coil, and the power amplifier circuit both need each design conformed respectively.

On the other hand, the control-signals-generating circuit can be applied the same operation processing program in either fluid filled type vibration damping device mounted on the different vehicle types or specification changed fluid filled type vibration damping device mounted on the same vehicle types. That is, the same control-signals-generating circuit can be applied in spite of "the main body of the fluid filled type vibration damping device which include the valve and the coil" and "the power amplifier circuit" are different. And because of the control-signals-generating circuit is formed separately from the power amplifier circuit, irrespective of "the main body of the fluid filled type vibration damping device which include the valve and the coil" and "the power amplifier circuit", the control-signals-generating circuit is able to be commonized. That is, part commonization of the control-signals-generating circuit in the fluid filled type vibration damping device mounted on the different vehicle types is able to be contrived. Therefore, it is able to make a low cost. Furthermore, in spite of the case that the device specification of the fluid filled type vibration damping device mounted on the same vehicle types is changed, the control-signals-generating circuit does not need to be changed. Consequently, the specification change is able to be corresponded easily.

Furthermore, according to the present invention, "the main body of the fluid filled type vibration damping device which include the valve and the coil" and "the power amplifier circuit" which have a relation one to one, are attached integrally and constituted the actuator unit. Because of unifying the both which have a relation one to one, the portion needed to be changed according to the specification can be grasped one part approximately. That is, the unique part according to one request specification is only one part of this unit. Therefore, because the main body of the fluid filled type vibration damping device and the power amplifier circuit are unified, the cut of parts numbers of unique parts can be contrived. Therefore, because that is connected with the cut of parts numbers of the whole fluid filled type vibration damping device, the management of parts comes to simply and to make a low cost is able to be contrived.

Furthermore, according to the fluid filled type vibration damping device of the present invention, when the coil is switched from electrical disconnection state to electrical connection state, the state switching control signals prefers that a signals output value, at the time after predetermined time from beginning of switching, is smaller than the signals output value during the time after predetermined time from beginning of switching. Here, the predetermined time is the time during before the valve state is switched or the time during just before the valve state is switched. That is, in the initial switching state which is switching the valve state, the signals output value are made large, and after that, in the holding state of the state after the valve is switched, the signals output value are made small.

Here, to move the valve for switching the valve state, large electromagnetic power is needed. But only to hold not to move the valve after switching, small electromagnetic power is sufficient. Therefore, by supplying the electric-current to the coil for generating the necessary and sufficient electromagnetic power to hold when the valve is held, it comes to be possible to curtail electric power consumption of the coil when the valve is held. As a result, the calorific value of the coil is able to be restrained. Therefore, by miniaturization of the coil and simplification of the coil radiation structure, the miniaturization of the main body of the fluid filled type vibration damping device is able to be contrived. Furthermore, by restraining of the calorific value of the coil, the temperature rise of the non-compressible fluid sealed in the fluid chamber is able to be restrained. Incidentally, if the temperature of the non-compressible fluid rise, the temperature of the main rubber elastic body constructing the fluid chamber sealing the non-compressible fluid rise and then there might arise a fear that the spring characteristics of the main rubber elastic body is affected. As a result, there might arise a fear that adequate vibration damping effect is not attained. However, according to the present invention, because the temperature rise of the fluid can be restrained, vibration damping effect is able to be attained adequately.

Furthermore, when the power amplifier circuit comprised the fluid filled type vibration damping device according to the present invention is equipped with a switching element and amplify the state switching control signals by being switched the switching element, to adopt above construction is effective. Thus, to switch the switching element is very easy and is able to control with high accuracy.

Here, in the wiring connecting the power amplifier circuit and the coil, amplified large electric-current flow. And by being switched the switching element, there might arise a fear that the switching noise and comparatively large noise because of change of electric-current are made. If the power amplifier circuit is disposed from the main body of the fluid filled type vibration damping device and the wiring connecting the power amplifier circuit and the coil expose outside of the main body of the fluid filled type vibration damping device and the length of the wiring is long, there might arise a fear that the wiring comes to cause of the making the noise and affects to other devices. For example, like the conventional devises, in the case that the power amplifier circuit is mounted near the engine controller and is connected by the wiring to the main body of the fluid filled type vibration damping device mounted at the engine portion, there is strong likelihood that the noise problems happen.

However, according to the fluid filled type vibration damping device of the present invention, the power amplifier circuit is constituted the actuator unit attached integrally to the main body of the fluid filled type vibration damping device. Therefore, almost or all of the wiring connecting the power amplifier circuit and the coil are embedded in the inside of the fluid filled type vibration damping device. The length of the wiring is very short. That is, there might not arise a fear that this wiring comes to cause of the making the noise and affects to other devices.

Furthermore, the fluid filled type vibration damping device according to the present invention prefers to comprise additionally an urging member exerting an urging force on the valve to make the second orifice passage the closed state at the initial state and the coil prefers to make to move the valve against the urging force of the urging member to make the second orifice passage the open state by the electromagnetic force occurring by the electrical connection.

Here, as above-mentioned, if the main vibration is shake vibration, the valve make the second orifice passage a closed state and if the main vibration is idling vibration, the valve make the second orifice passage a open state. And the electromagnetic force to make to move the valve against the urging force of the urging member and the electromagnetic force to hold the valve with the state that the valve was moved, needs to bigger than the force that are added the flowing force of the non-compressible fluid occurred at that time to the urging force of the urging member.

Furthermore, in the case that idling vibration, which is the high frequency band, occurs, the flowing force of the non-compressible fluid get smaller compared with in the case that shake vibration, which is the low frequency band, occurs. That is, in the case that the flowing force of the non-compressible fluid becomes small, by the electromagnetic force affecting by the electrical connection to the coil, the valve is made to move and hold. Therefore, the electromagnetic force to make to move the valve and the electromagnetic force to hold the valve with the state, that the valve was moved, are able to be made small. Therefore, the electric-current to supply to the coil is able to be curtailed. As a result, the electric power consumption of the coil is able to be curtailed. That makes to restrain the calorific value of the coil. As a result, with the miniaturization of the main body of the fluid filled type vibration damping device is able to be contrived, the adequate vibration damping effect is able to be attained.

DETAILED DESCRIPTION OF THE PREFERRED EMBODIMENTS

Figure 1:
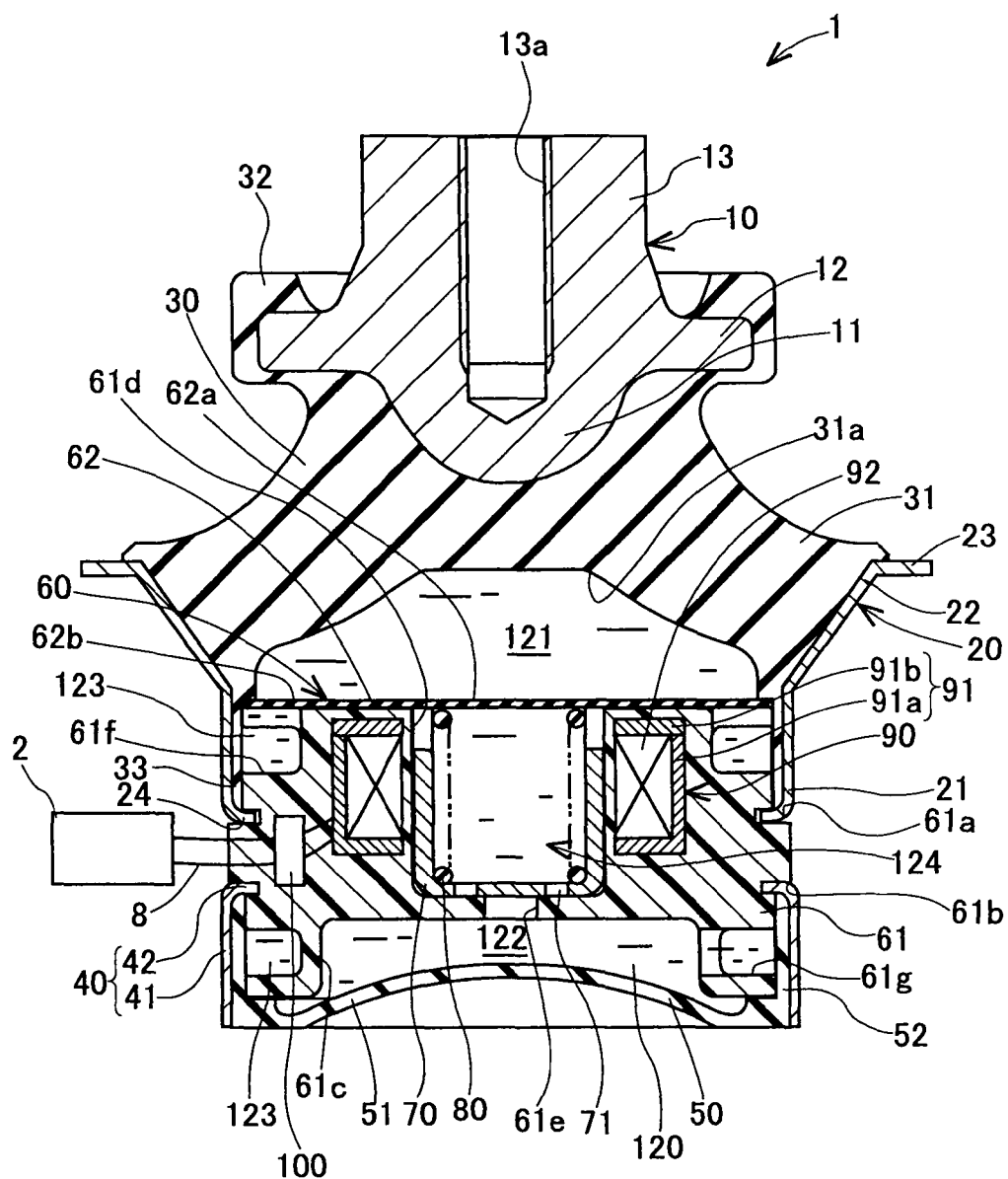
FIG. 1 is a construction view of the fluid filled type vibration damping device.
Figure 2:
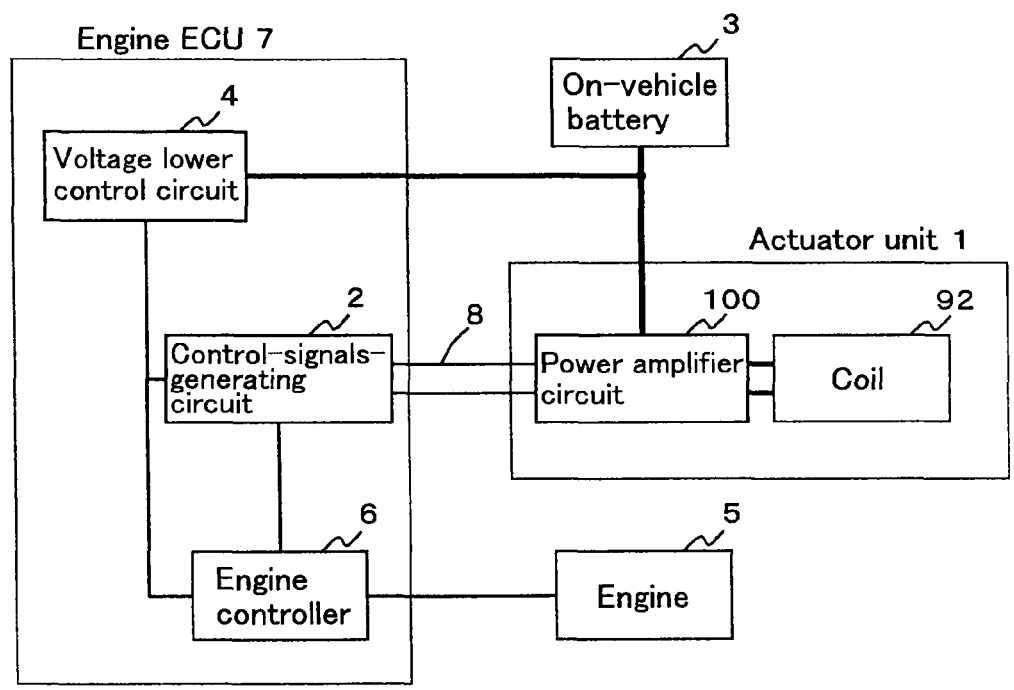
FIG. 2 is a block diagram of the whole system which includes the fluid filled type vibration damping device.
Figure 3:
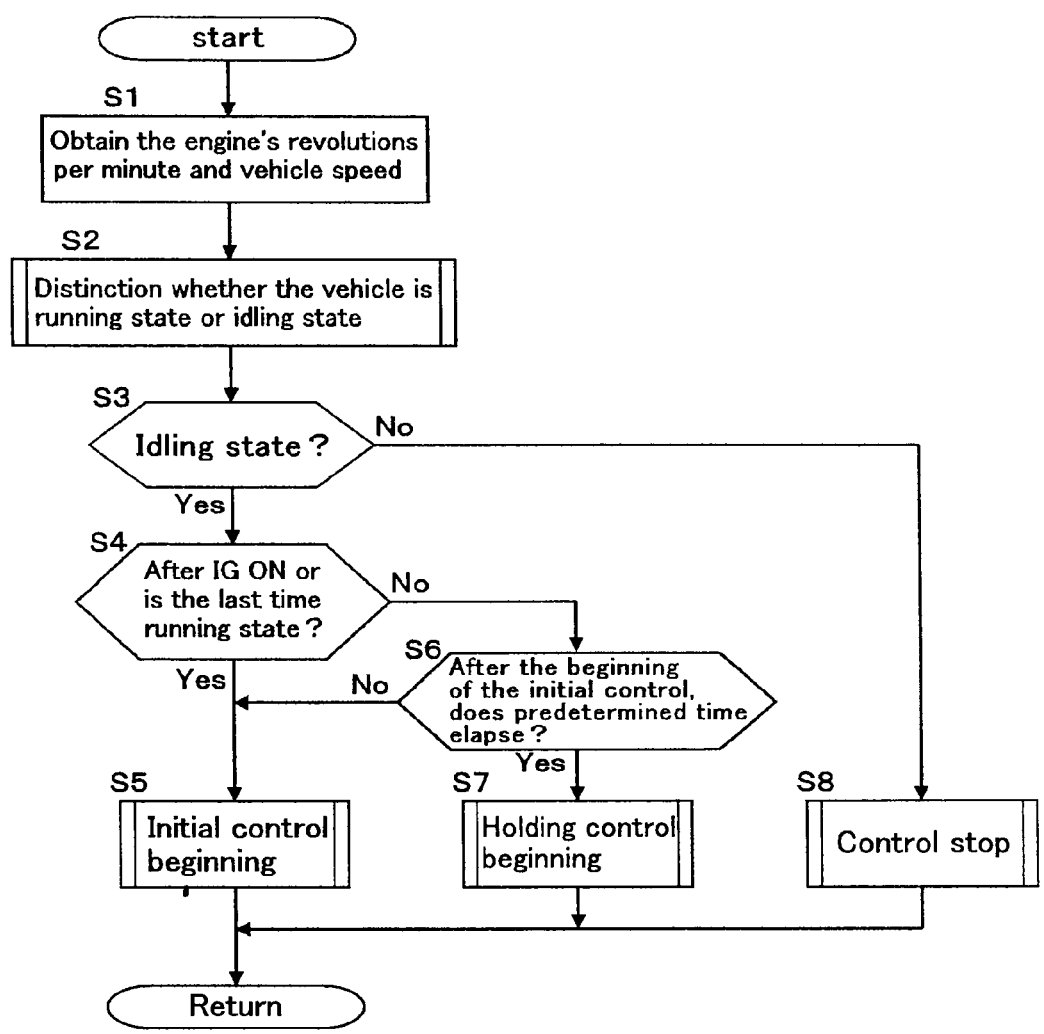
FIG. 3 is a flowchart of the control-signals-generating circuit 2.
Figure 4:
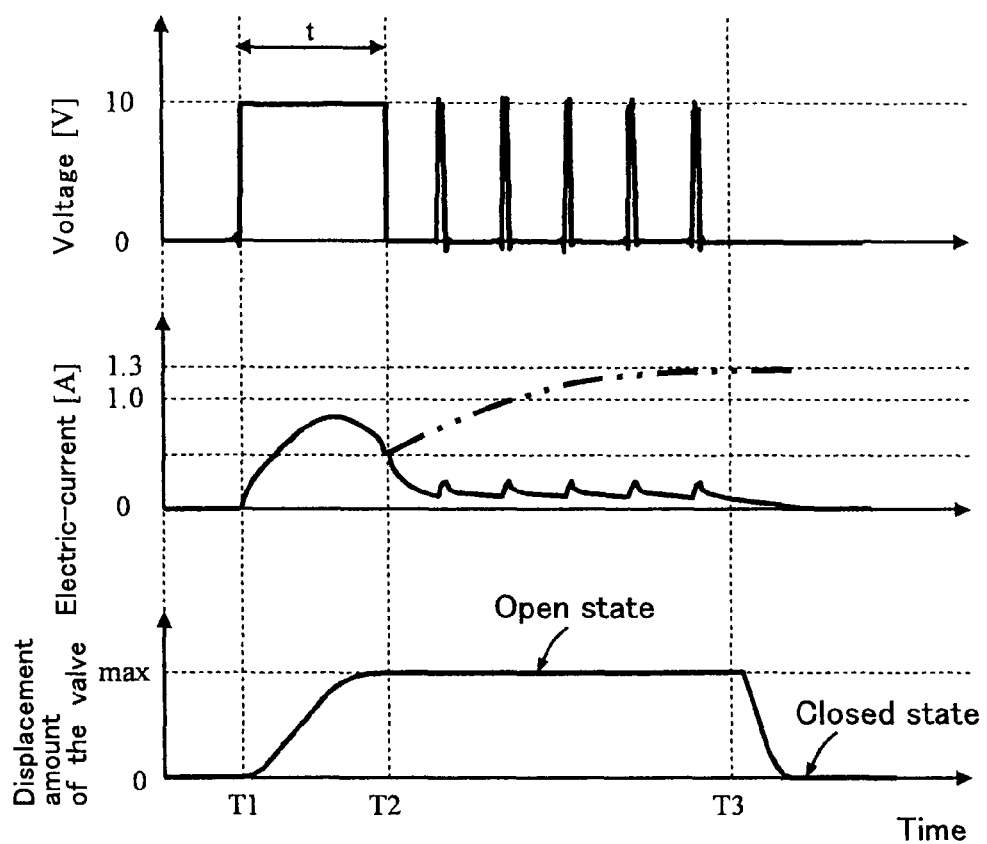
FIG. 4 is a timing chart from the start of the control to the stop of the control.

Next, the fluid filled type vibration damping device according to the present invention will be described referring to FIG. 1~FIG. 4. FIG. 1 is a construction view of the fluid filled type vibration damping device. FIG. 2 is a block diagram of the whole system which includes the fluid filled type vibration damping device. FIG. 3 is a flowchart of the control-signals-generating circuit 2. FIG. 4 is a timing chart from the start of the control to the stop of the control.

As illustrated in FIG. 1, the fluid filled type vibration damping device comprises an actuator unit 1 and a control-signals-generating circuit 2. The actuator unit 1 comprises a first mounting member 10 of metal, a second mounting member 20 of metal, a first rubber member 30, a fixation member 40 of metal, a second rubber member 50, a partition member 60, a valve 70, an urging member 80, a coil member 90 and a power amplifier circuit 100.

The first mounting member 10 is made of a rigidity member which made of iron or aluminum alloy and so on and has generally round block shape on the whole. This first mounting member 10 comprises a fastening portion 11, a stopper portion 12 and a threaded portion 13 that are formed integrally. The fastening portion 11 has a hemisphere shape projecting axially downward. The stopper portion 12 is formed into a disk shape on the upper end of the fastening portion 11. The threaded portion 13 is formed into a columnar shape that extend axially above the stopper portion 12. A bolt conclusion hole 13a extending axially is formed in the center of the threaded portion 13. And the members on the side of power unit 5 (hereinafter referred to as "an engine") is fixed to the first mounting member 10 by an conclusion bolt threaded into the bolt conclusion hole 13a.

The second mounting member 20 is made of a rigidity member which made of iron or aluminum alloy and so on and has a thin-walled, large diameter, round tubular shape on the whole. This second mounting member 20 comprises a tubular portion 21, a tapering portion 22, a flanged portion 23 and a first lock projection portion 24 that are formed integrally. The tubular portion 21 is the lower parts from the axial middle of the second mounting member 20 and is formed into a tubular shape extending axially with fixed diameter. The tapering portion 22 flares out as a tapering shape gradually towards the outside in the axial direction from the upper end of the tubular portion 21. The flanged portion 23 spreads outward in the axis-perpendicular direction as a circular ring shape from the upper end of the tapering portion 22. The first lock projection portion 24 is formed into a circular ring shape towards the inside in the diametrical direction from the lower end of the tubular portion 21. For example, a bracket (not shown) is fitted externally and fixed onto this second mounting member 20. And the second mounting member 20 is attached fixedly to the vehicle body by that this bracket is fixed to the member on the side of vehicle body (for example, engine frame).

The first rubber member 30 comprises a main rubber elastic body 31, a stopper rubber 32 and a first seal rubber 33. The main rubber elastic body 31 connects the first mounting member 10 and the second mounting member 20 elastically for disposing concentrically and for that the first mounting member 10 is spaced axially upward from the flanged portion 23 of the second mounting member 20. The main rubber elastic body 31 has a thick-walled, frustoconical shape on the whole and forms a round recess 31a that opens axially downward at the central lower end. And concretely, the upper side portion of the main rubber elastic body 31 is bonded by vulcanization thereto to bury the fastening portion 11 of the first mounting member 10. Furthermore, the outer circumferential portion of the lower end of the main rubber elastic body 31 is bonded by vulcanization thereto to the tapering portion 22 and the flanged portion 23 of the second mounting member 20.

The stopper rubber 32 is formed integrally on the upper end of the main rubber elastic body 31 and is bonded by vulcanization thereto to cover the outer circumferential end face, lower end face and upper end face of the stopper portion 12. The first seal rubber 33 is formed into a tubular shape that extends axially downward from the axial lower end of the main rubber elastic body 31. The outer circumferential face of this first seal rubber 33 is bonded by vulcanization thereto to whole of the inner circumferential face of the tubular portion 21 of the second mounting member 20. This first seal rubber 33 seals to form a first orifice passage 123 between the outer circumferential face of a partition member 60 described later and itself.

The fixation member 40 is made of a rigidity member which made of iron or aluminum alloy and so on and has a thin-walled, large diameter, round tubular shape on the whole. This fixation member 40 comprises a tubular portion 41 and a second lock projection portion 42 that are formed integrally. The tubular portion 41 is formed into a tubular shape extending axially with the same diameter as the tubular portion 21 of the second mounting member 20. The second lock projection portion 42 is formed into a circular ring shape towards the inside in the diametrical direction from the upper end of the tubular portion 41. The inner diameter of the second lock projection portion 42 is the same as the inner diameter of the first lock projection portion 24. And this fixation member 40 is disposed concentrically and is spaced axially downward from the second mounting member 20.

The second rubber member 50 comprises a diaphragm 51 as a flexible film and a second seal rubber 52. The diaphragm 51 is made of thin rubber film having an enough slack and has a round dome shape. The outer circumferential face of this diaphragm 51 is bonded by vulcanization thereto to the inner circumferential lower end portion of the tubular portion 41 of the fixation member 40. The second seal rubber 52 is formed into a tubular shape that extends axially upward from the outer circumference of the diaphragm 51. The outer circumferential face of this second seal rubber 52 is bonded by vulcanization thereto to the whole inner circumferential face of the tubular portion 41 of the fixation member 40. This second seal rubber 52 seals to form a first orifice passage 123 between the outer circumferential face of a partition member 60 described later and itself. Moreover, the diaphragm 51 is fixed to the second mounting member 20 via the partition member 60. Furthermore, a fluid chamber 120 having a non-compressible fluid sealed therein is formed between the diaphragm 51 and the main rubber elastic body 31.

The partition member 60 has generally round block shape on the whole and is installed in the second mounting member 20 and the fixation member 40 to connect the both members 20, 40 with separating the fluid chamber 120 into a pressure-receiving chamber 121 on the side of the main rubber elastic body 31 and an equilibrium chamber 122 on the side of the diaphragm 51. Concretely, the partition member 60 comprises a main partition member 61 and an upper plate fitting 62.

The main partition member 61 has round tubular block shape. This main partition member 61 is made of a hard rigidity resin which is the unmagnetized material. Onto the almost axially center portion within the outer circumferential face of this main partition member 61, a first lock groove 61a and a second lock groove 61b are formed around the whole circumference. These first lock groove 61a and second lock groove 61b are formed to be spaced axially with predetermined distance. And the first lock projection portion 24 of the second mounting member 20 is locked for axial direction onto the first lock groove 61a formed axially upward. Furthermore, the second lock projection portion 42 of the fixation member 40 is locked for axial direction onto the second lock groove 61b formed axially downward. At that time, the outer circumferential face of the main partition member 61 is brought into close contact with the inner circumferential face of the first seal rubber 33 and the second seal rubber 52.

Furthermore, an axially through-hole is formed in the center of the axis of the main partition member 61. Concretely, a downward concavity 61c is formed on the lower section of the main partition member 61 and a upward hole 61d is formed on the upper section from near center in the axial direction. The inner diameter of this upward hole 61d is smaller than the inner diameter of the downward concavity 61c. Furthermore, a small diameter hole 61e communicated with the downward concavity 61c and the upward hole 61d is formed. The inner diameter of this small diameter hole 61e is more smaller than the inner diameter of the upward hole 61d. The axial length of the small diameter hole 61e is formed shorter sufficiently than the axial length of the downward concavity 61c and the upward hole 61d.

Furthermore, an upper circumferential groove 61f, that extends continuously prescribed length around the circumference and is formed opening onto its outer circumferential face, is formed on the upper end section of the main partition member 61. The one of the end section around the circumference of this upper circumferential groove 61f is formed opening upward. Furthermore, a lower circumferential groove 61g, that extends continuously prescribed length around the circumference and is formed opening onto its outer circumferential face, is formed on the outer circumference of the downward concavity 61c in the lower end of the main partition member 61. The one of the end section around the circumference of this lower circumferential groove 61g is formed opening diametric inward, namely on the downward concavity 61c. And, the other end section around the circumference of the upper circumferential groove 61f and the other end section around the circumference of the lower circumferential groove 61g are superposed in the case seen from the axial direction. Then, a through hole (not shown) communicated axially with the other end section around the circumference of the upper circumferential groove 61f and the other end section around the circumference of the lower circumferential groove 61g is formed.

The upper plate fitting 62 is made of metallic material which made of iron or aluminum alloy and so on and has a thin-walled round plate shape as same outer diameter of the main partition member 61. Furthermore, a central round hole 62a, that has smaller diameter than the inner diameter of the upward hole 61d and as almost same as the diameter of the small diameter hole 61e, is formed on the center of the upper plate fitting 62. And this upper plate fitting 62 is disposed to be superposed with the upper end face of the main partition member 61. Furthermore, a outside hole 62b is formed on the portion in the upper plate fitting 62 that is corresponded to the one of the end section around the circumference of the upper circumferential groove 61f of the main partition member 61.

Therefore, a pressure-receiving chamber 121, a part of whose wall is constituted by a round concavity 31a of the main rubber elastic body 31, is formed between the partition member 60 and the main rubber elastic body 31. Therefore, the inner pressure of this pressure-receiving chamber 121 fluctuates by the deformation of the main rubber elastic body 31 when vibration is input. Additionally, an equilibrium chamber 122, a part of whose wall is constituted by the diaphragm 51, and that readily permits change in volume, is formed between the partition member 60 and the diaphragm 51. Furthermore, by the upper circumferential groove 61f, the lower circumferential groove 61g, the through hole (not shown) and the outside hole 62b of the upper plate fitting 62, the first orifice passage 123 is formed to communicate the pressure-receiving chamber 121 and the equilibrium chamber 122 with each other. This first orifice passage 123 has been tuned to a low-frequency band correspond to shake vibration by the engine 5. And by the downward concavity 61c, the upward hole 61d, the small diameter hole 61e and the central round hole 62a of the upper plate fitting 62, the second orifice passage 124 is formed to communicate the pressure-receiving chamber 121 and the equilibrium chamber 122 with each other. This second orifice passage 124 has been tuned to a high-frequency band correspond to shake vibration by the engine 5.

The valve 70 is ferromagnetic material which made of magnetic material as an iron and so on and has a bottomed round tubular shape on the whole. And this valve 70 is put in the region which is formed by the upward hole 61d of the main partition member 61 and the upper plate fitting 62. The outer diameter of this valve 70 is little smaller than the inner diameter of the upward hole 61d of the main partition member 61. And the outer diameter of this valve 70 is larger than the inner diameter of the central round hole 62a of the upper plate fitting 62. That is, a few space is formed between the outer circumferential face of the valve 70 and the inner circumferential face of the upward hole 61d. Furthermore, the axial length of the valve 70 is formed shorter than the axial length of the upward hole 61d of the main partition member 61. That is, the valve 70 is supported allowing to move axially against the partition member 60 in the accommodation region.

Furthermore, at the bottom face portion of the valve 70, the plural communicative connection windows 71 which penetrate in the direction of the board thickness are formed. These plural communicative connection windows 71 are formed in the off-centering position and to be spaced respectively around the circumference. And the communicative connection windows 71 are formed in the different position for the small diameter hole 61e in the case seen from the axial direction. That is, in the state that the bottom face portion of the valve 70 touches the lower face of the upward hole 61d of the main partition member 61, the small diameter hole 61e and the communicative connection windows 71 are blockaded each other. Therefore, the valve 70 enables to switch the second orifice passage 124 between an open state and a closed state by moving relatively in the axial direction for the partition member 60.

The urging member 80 comprises a coil spring and is disposed on the side of the inner circumference of the valve 70. And the urging member 80 exerts axial urging force to the bottom face portion of the valve 70 and the upper plate fitting 62. That is, the urging member 80 exerts urging force in the direction that the valve 70 spaces the upper plate fitting 62 at the initial state. Accordingly, the initial state is the state that the bottom face portion of the valve 70 touches the lower face of the upward hole 61d and the second orifice passage 124 becomes a closed state.

The coil member 90 comprises a yoke 91 and a coil 92 winded around the yoke 91. The yoke 91 is made of the ferromagnetic material. The yoke 91 comprises a lower yoke 91a that has a bottomed round tubular shape equipped with a bottom wall portion having an annular plate shape and an upper yoke 91b that has a annular plate shape and is assembled from the upper side of the lower yoke 91a. And the coil 92 is disposed between the opposed surfaces of the bottom wall portion of the lower yoke 91a and the upper yoke 91b.

The coil member 90 composed in this way are embedded inside of the main partition member 61 to surround the outer circumference of the upward hole 61d of the main partition member 61. That is, the valve 70 moves upward against the urging member 80 by an electromagnetic force occurring by supplying the electric-current to the coil 92.

The power amplifier circuit 100 is the circuit that supplies an electric-current to the coil 92 by amplifying the state switching control signals produced a control-signals-generating circuit 2 described later. This power amplifier circuit 100 is embedded in the side of the outer circumference of the coil member 90 and also in the side of the inner circumference of the first lock groove 61a and the second lock groove 61b, within inside of the main partition member 61. This power amplifier circuit 100 connects to the coil 92 electrically by wiring. A wiring 8 connecting to the power amplifier circuit 100 extends from the space between the first lock groove 61a and the second lock groove 61b in the main partition member 61 to the outside.

Here, the power amplifier circuit 100 is explained in detail referring to FIG. 2. In FIG. 2, the thick line in the lines connects with each blocks shows the wiring in which large electric-current flows and the thin line shows the wiring in which small electric-current flows.

The power amplifier circuit 100 comprises a switching element, which is connected in series to the positive electrode terminal of on-vehicle battery 3 and one of the coil 92, and a diode which cathode is connected between the switching element and the coil 92 and anode is grounded. And the state switching control signals are amplified with DUTY driving (corresponds to switching drive) the switching element by the state switching control signals which are output from the control-signals-generating circuit 2.

The control-signals-generating circuit 2 drives to be supplied electric-current that is made voltage lower the electric-current of on-vehicle battery 3 by a voltage lower control circuit 4. The voltage that lowers by the voltage lower control circuit 4 is for example 3.3V or 5V. That is, the maximum voltage that the control-signals-generating circuit 2 can output is 3.3v or 5V. Furthermore, the control-signals-generating circuit 2 is disposed in an engine ECU 7 as the same unit as the voltage lower control circuit 4 and the engine controller 6 that controls the engine 5. That is, this control-signals-generating circuit 2 is mounted on the control substrate that the engine controller 6 is mounted on, or is disposed near the control substrate that the engine controller 6 is mounted on. This engine ECU 7 is disposed in the vehicle room. That is, the control-signals-generating circuit 2 is formed and disposed separately from the actuator unit 1 comprises the power amplifier circuit 100.

This control-signals-generating circuit 2 comprises for example the microcomputer. Concretely, the control-signals-generating circuit 2 includes for example ROM memorizing operation programs in advance, RAM memorizing input information from the engine controller 6 temporarily and CPU doing operation process which carry out operation programs based on the input information.

Then, the control-signals-generating circuit 2 distinguishes between the running state, that the vehicle occur shake vibration as the main component of the vibration, and the idling state that the vehicle occur idling vibration as the main component of the vibration. And the control-signals-generating circuit 2 produces state switching control signals of the valve 70, in other words, the control signals to switch the valve 70 between a closed state and an open state based on the vehicle state signals that are this distinguished result. The state switching control signals are transmitted to the power amplifier circuit 100 by the wiring 8. The state switching control signals are small electric-current signals. Furthermore, the switching element of the power amplifier circuit 100 is DUTY driven based on the state switching control signals produced by the control-signals-generating circuit 2.

Here, the process of the control-signals-generating circuit 2 is explained in detail referring to FIG. 3 and FIG. 4. First, the control-signals-generating circuit 2 obtains the information of engine's revolutions per minute and vehicle speed from the engine controller 6 (step S1). Here, the control-signals-generating circuit 2 is disposed at engine ECU 7 as same as the engine controller 6. Therefore, when the control-signals-generating circuit 2 obtains above information from the engine controller 6, it can obtain speedy and easily without influence of the noise.

Continuously, whether the vehicle is running state or idling state is distinguished based on the obtained information of engine's revolutions per minute and vehicle speed (step S2). And at this step, the vehicle state signals that is idling state or running state are produced and are memorized in RAM.

Continuously, at the time that the vehicle state signals is idling state signals (step S3:Yes), whether just after the ignition switch (IG) is made on or the vehicle state signals memorized at the last time is running state are distinguished (step S4). And at that time that just after the ignition switch (IG) is made on or the vehicle state signals memorized at the last time is running state, the initial control is carried out (step S5). And the process is returned.

On the other hand, at the step S4 at the case that it is not just after the ignition switch is made on and the vehicle state signals memorized at the last time is not running state, whether the predetermined time t elapses or not after the initial control is begun is distinguished (step S6). And if after the initial control is begun, the predetermined time t does not elapse, it goes to step S5 and the initial control is continued. Therefore, if the time is just after the initial control is begun, naturally the predetermined time t does not elapse, so that the initial control is continued. Moreover, this predetermined time t was memorized at ROM of the control-signals-generating circuit 2 in advance.

Here, the initial control is explained in detail referring to FIG. 4. At FIG. 4, the upper figure shows output voltage of the switching element in response to the passage of time. The middle figure shows the electric-current supplied to the coil 92 in response to the passage of time. The lower figure shows the axial displacement amount of the valve 70 in response to the passage of time. That is, the case that the displacement amount of the valve 70 is 0 means that the second orifice passage 124 is closed state, and the case that the displacement amount of the valve 70 is the maximum means that the second orifice passage 124 is open state.

First, until the initial control begins, that is, until the time T1 at the FIG. 4, the state switching control signals were not output. Therefore, the switching element of the power amplifier circuit 100 is OFF. At this time because the electric-current does not flow in the coil 92, the second orifice passage 124 that is at initial state is made closed state.

And, if the initial state is begun, the state switching control signals becomes the maximum voltage signals, that is, signals of DUTY 100%, and this state switching control signals are output continuously. That is, at the initial state, the switching element is always ON. At that time, the voltage of the switching element is applied the voltage of 10V from the on-vehicle battery 3. Therefore, the electric-current that is shown during from the time T1 to T2 at the middle figure of FIG. 4 flows in the coil 92. That is, the electric-current flowing in the coil 92 rises to 1.0 A just after initial control beginning and then decreases a little. And during from the time T1 to T2, the displacement amount of the valve 70 becomes larger, and at the time T2 the displacement amount of the valve 70 comes to maximum. That is, the initial control is the control that from beginning to move the valve 70, to the displacement amount the valve 70 comes to maximum.

On the other hand, if the case that the switching element is continued to be ON after the time T2, the behavior is shown like the two dotted line shown FIG. 4. That is, the electric-current flowing in the coil 92 is saturated to 1.3 A.

Back to the flowchart of FIG. 3, the flowchart is explained. At the step S6 in the case that after the beginning of the initial control, the predetermined time t elapsed, the initial control is stopped and the holding control is carried out (step S7). And the process is returned.

And at step S3 in the case that the vehicle state signals is running state signals (step S3:No), the switching control, that is the initial control, and the holding control are stopped (step S8). That is, the holding control is carried out during from the time that the predetermined time t elapsed after beginning of the initial control to the time that the vehicle comes to running state.

Here, the holding control is explained referring to FIG. 4. The holding control controls to hold the state after the valve 70 comes to maximum displacement amount. In this holding control, the state switching control signals is pulse signals that is periodic DUTY 10% as shown the upper figure of FIG. 4. That is, for only 10% of the time in predetermined period, the switching element of the power amplifier circuit 100 is ON, and for the rest 90% of the time, the switching element is OFF. Therefore, the state switching control signals makes the signals output value in the holding control smaller than the signals output value in the initial control.

At this time, the average of the electric-current flows in the coil 92 is about 0.1 A. That is, the electric-current supplied to the coil 92 in the holding control makes small fully compared with the initial control case. The force to hold the valve 70 already moved to the maximum displacement amount is very small compared with the force to move the valve 70 in the initial control. Therefore, by only supplying a few electric-current to the coil 92, the valve 70 can holds the maximum displacement amount state as shown as the lower figure of FIG. 4.

And if the control is stopped at the case that the vehicle state signals is running state, the state switching control signals is not output, and the switching element of the power amplifier circuit 100 is made OFF. That is, if the vehicle state signals is running state at the time T3 in the FIG. 4, in the time when after a little time passes, the electric-current flows in the coil 92 becomes 0 and the valve 70 returns to the initial state. And the second orifice passage 124 is switched closed state.

Here, in present embodiments, the construction that the valve 70 is moved at the idling state is adopted. Here, the electromagnetic force to hold the valve 70 with the state that the valve is at the maximum displacement amount needs to be bigger than the force that are added the urging force of the urging member 80 to the flowing force of the non-compressible fluid occurred at that time. And in the case that idling vibration which is the high frequency band occurs, the flowing force of the non-compressible fluid get smaller compared with the case that shake vibration which is the low frequency band occurs. That is, in the idling state that the flowing force of the non-compressible fluid becomes small, the coil 92 is supplied with the electric-current and the valve 70 is held at the state that the valve is at the maximum displacement amount. Therefore, to adopt the construction that the valve 70 is moved at the idling state, the electric-current that supplied to coil 92 is able to be made smaller in the holding control.

And if the electric-current that supplied to the coil 92 is curtailed, the electric power consumption of the coil 92 is able to be curtailed. That is, as described above, by holding the valve 70 with the state that the valve is at the maximum displacement amount, because of supplying the electric-current to the coil 92 in the idling state with DUTY is made smaller compared with the initial control that DUTY is 100% in the holding control, the electric power consumption of the coil 92 is more curtailed.

In this way, because of being able to curtail the electric power consumption of the coil 92, the calorific value of the coil 92 results to be restrained. Therefore, by the miniaturization of the coil 92 and the miniaturization of the radiation construction of the coil 92, the miniaturization of main body of the fluid filled type vibration damping device is able to be contrived. Furthermore, by restraining the calorific value of the coil 92, the temperature rise of the non-compressible fluid sealed in the fluid chamber 120 is able to be restrained. If the temperature of the non-compressible fluid rise, the temperature of the main rubber elastic body 31 constructing the fluid chamber 120, sealing the non-compressible fluid, rise and then there might arise a fear that the spring characteristics is affected. As a result, there might arise a fear that adequate vibration damping effect is not attained. However, according to the present embodiments, because the temperature rise of the non-compressible fluid can be restrained, vibration damping effect is able to be attained adequately.

Here, in the fluid filled type vibration damping device mounted on the different vehicle types, the main body of the fluid filled type vibration damping device which include the valve 70 and the coil 92, and the power amplifier circuit 100 both need each design conformed respectively. And, also in the specification changed fluid filled type vibration damping device mounted on the same vehicle types, the main body of the fluid filled type vibration damping device which include the valve 70 and the coil 92, and the power amplifier circuit 100 both need each design conformed respectively. In this way, "the valve 70 and the coil 92" and "the power amplifier circuit 100" have a relation one to one.

On the other hand, the control-signals-generating circuit 2 can be applied the same operation processing program in either the fluid filled type vibration damping device mounted on the different vehicle types or the specification changed fluid filled type vibration damping device mounted on the same vehicle types. That is, the same control-signals-generating circuit 2 can be applied in spite of that the main body of the fluid filled type vibration damping device which include the valve 70 and the coil 92 and the power amplifier circuit 100 are different. And because the control-signals-generating circuit 2 is formed separately from the power amplifier circuit 100, irrespective of the main body of the fluid filled type vibration damping device and the power amplifier circuit 100, the control-signals-generating circuit 2 is able to be commonized. Therefore, it is able to contrive a low cost. Furthermore, in spite of the case that the device specification of the fluid filled type vibration damping device mounted on the same vehicle types is changed, the control-signals-generating circuit 2 does not need to be changed. Consequently, the specification change is able to be corresponded easily.

Furthermore, according to the fluid filled type vibration damping device of the present embodiments, "the valve 70 and the coil 92" and "the power amplifier circuit 100" which have a relation one to one, were formed integrally as the actuator unit 1. Because of unifying the both which have a relation one to one, the portion, needed to be changed according to the specification, can be grasped one part approximately. That is, the unique part according to one request specification is only one part of this actuator unit 1. Therefore, the cut of parts numbers of unique parts can be contrived and the management of parts comes to simplify, and as a result, to make a low cost can be contrived.

Furthermore, the power amplifier circuit 100 amplify the state switching control signals by being switched the switching element. In this way, in the case that it is being switched, there might arise a fear that the switching noise and comparatively large noise because of change of electric-current are made in the wiring that connects the power amplifier circuit 100 and the coil 92. However, almost or all of this wiring are embedded in the inside of the main partition member 61 and the length of the wiring is very short. Therefore, there might not arise a fear that this wiring comes to cause of the making the noise. Otherwise, the wiring 8 connecting the power amplifier circuit 100 and the control-signals-generating circuit 2 expose outside and the length of the wiring is very long. However, because this wiring 8 is so-called signal line communicating the control signals, the electric-current flowing in the wiring 8 is small. Therefore, there might not arise a fear that this wiring 8 comes to cause of the making the noise. In this way, because of being able to restrain the occurring the noise, there might not arise a fear that this wiring 8 affects to other devices.

Furthermore, in the above embodiments the state switching control signals is pulse signals that is periodic DUTY 10%. But this is minimum DUTY. If the DUTY is made smaller than this DUTY, the state that the valve 70 is the maximum displacement amount can not be hold. Of course, if the DUTY is made larger than 10%, naturally, the state that the valve 70 is the maximum displacement amount can be hold.

What is claimed is:

1. A fluid filled type vibration damping device comprising:
   a first mounting member attached to one of a power unit and a body of a vehicle;
   a second mounting member attached to the other of the power unit and the body of the vehicle;
   a main rubber elastic body elastically connecting the first mounting member and the second mounting member;
   a flexible membrane mounted on the second mounting member and forming, together with the main rubber elastic body, a fluid chamber in which a non-compressible fluid is sealed;
   a partition member mounted to the second mounting member and dividing the fluid chamber into a pressure receiving chamber, a part of the pressure receiving chamber being formed by the main rubber elastic body, and an equilibrium chamber, a part of the equilibrium chamber being formed by the flexible membrane, the partition member being formed with a first orifice passage communicating the pressure receiving chamber and the equilibrium chamber with each other and being tuned to a low-frequency band corresponding to a shake vibration generated by the power unit, and a second orifice passage being tuned to a high-frequency band corresponding to an idling vibration;
   a valve relatively movably supported on the partition member for switching the second orifice passage between an open state and a closed state in accordance with a vehicle state that the vehicle generates the shake vibration and a vehicle state that generates the idling vibration;
   a coil attached to either one of the second mounting member or the partition member, the coil actuating the valve by an electromagnetic force generated upon power distribution;
   a control signal generating circuit formed independently of and arranged separately from the second mounting member, the partition member and the coil, and generating through a computing process a state switching control signal for actuating the valve based on a vehicle state signal indicating the vehicle state in which the vehicle generates the shake vibration or the idling vibration; and
   a power amplifier circuit electrically connected to the coil by wiring and formed with an actuator unit attached integrally to any one of the second mounting member, the partition member or the coil, the power amplifier circuit being disposed separately from the control signal generating circuit, and the power amplifier circuit supplying the electric-current to the coil by amplifying the state switching control signal.

2. The fluid filled type vibration damping device according to claim 1, wherein a signal output value of the state switching control signal of the control signal generating circuit at a time after a predetermined time has passed from a start of the switching operation from a non-conductive state of the coil to a conductive state of the coil is smaller than a signal output value during a time before the predetermined time has passed from the start of the switching operation.

3. The fluid filled type vibration damping device according to claim 1, wherein the power amplifier circuit comprises a switching element for amplifying the state switching control signal.

4. The fluid filled type vibration damping device according to claim 1, further comprising an urging member exerting an urging force on the valve so that the second orifice passage is in the closed state at an initial state thereof, wherein the coil actuates the valve by overcoming the urging force of the urging member so that the second orifice passage becomes in the open state by the electromagnetic force generated upon the power distribution.

* * * * *